United States Patent
Halabian

(10) Patent No.: US 11,476,920 B2
(45) Date of Patent: Oct. 18, 2022

(54) METHODS AND APPARATUSES FOR SATELLITE CONNECTIVITY ACROSS AN ORBITAL SEAM

(71) Applicant: HUAWEI TECHNOLOGIES CO., LTD., Shenzhen (CN)

(72) Inventor: Hassan Halabian, Kanata (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 108 days.

(21) Appl. No.: 17/160,842

(22) Filed: Jan. 28, 2021

(65) Prior Publication Data

US 2022/0239365 A1 Jul. 28, 2022

(51) Int. Cl.
*H04W 36/36* (2009.01)
*H04B 7/0426* (2017.01)
*H04B 7/204* (2006.01)
*H04W 72/12* (2009.01)
*H04B 7/185* (2006.01)

(52) U.S. Cl.
CPC ..... *H04B 7/18513* (2013.01); *H04B 7/18519* (2013.01)

(58) Field of Classification Search
CPC ... H04W 36/36; H04W 52/143; H04W 36/32; H04W 16/14; H04W 84/06; H04W 52/243; H04W 52/246; H04W 16/28; H04W 72/12; H04B 7/18513; H04B 7/18521; H04B 7/195; H04B 7/043; H04B 7/18595; H04B 7/18563; H04B 7/2041; H04B 7/1851; H04B 7/18526; H04B 7/18515; H04B 17/40; H04B 7/155; H01Q 3/2611; H04L 2012/6421

USPC .......................................................... 370/316
See application file for complete search history.

(56) References Cited

U.S. PATENT DOCUMENTS

| 10,368,251 | B1* | 7/2019 | Olds ..................... H04W 16/28 |
| 11,075,689 | B1* | 7/2021 | Hassan ............... H04B 7/18513 |
| 11,096,188 | B1* | 8/2021 | Vasisht .............. H04B 7/18517 |
| 11,336,371 | B2* | 5/2022 | Nykolak .............. H04B 10/118 |

(Continued)

OTHER PUBLICATIONS

Benzi et al., Optical Inter-Satellite Communication: the Alphasat and Sentinel-1A in-orbit experience, SpaceOps Conferences, 14th International Conference on Space Operations, Daejeon, Korea, May 16-20, 2016.

(Continued)

*Primary Examiner* — Edan Orgad
*Assistant Examiner* — Vanneilian Lalchinthang

(57) ABSTRACT

There is provided methods and apparatuses for enabling satellite communication across an orbital seam thereby at least in part improving network latency. According to embodiments, methods and apparatuses are provided to improve network connectivity of satellite networks, where satellite mobility together with long signal acquisition times reduce reliable communication across an orbital seam in a satellite network. According to embodiments, the methods and apparatuses apply to non-terrestrial, for example satellite, polar constellation networks configured to provide global communications services, wherein these communications services may not be supported by terrestrial networks, for example wire-based or fibre-based networks.

16 Claims, 10 Drawing Sheets

(56) References Cited

U.S. PATENT DOCUMENTS

| | | | |
|---|---|---|---|
| 2008/0045146 A1* | 2/2008 | Wahlberg | H04B 7/18573 |
| | | | 455/12.1 |
| 2017/0026108 A1* | 1/2017 | Haziza | H04L 7/043 |
| 2017/0070939 A1* | 3/2017 | Chong | H04B 7/18513 |
| 2018/0159617 A1* | 6/2018 | Nobbe | H04B 7/18534 |
| 2019/0207676 A1* | 7/2019 | Noerpel | H04B 7/2041 |
| 2019/0245590 A1* | 8/2019 | Singh | H04W 52/246 |
| 2022/0052756 A1* | 2/2022 | Choinière et al. | H04W 28/16 |

OTHER PUBLICATIONS

Yang et al., Doppler characterization of laser inter-satellite links for optical LEO satellite constellations, Optics Communications, vol. 282, Issue 17, 2009, pp. 3547-3552.

Sarath Ganga et al., Design of a Standardized Inter Satellite Optical Wireless Communication (IsOWC) System with Minimum Input Power, Procedia Technology, vol. 25, 2016, pp. 567-573.

Kaushal et al., Optical Communication in Space: Challenges and Mitigation Techniques, Department of Electrical, Electronics and Communications Engineering, The NorthCap University, Gurgaon, Haryana, India, May 28, 2017.

Kaymak et al., A Survey on Acquisition, Tracking, and Pointing Mechanisms for Mobile Free-Space Optical Communications, IEEE Communications Surveys & Tutorials, vol. 20, No. 2, pp. 1104-1123.

Gregory et al., TESAT laser communication terminal performance results on 5.6Gbit coherent inter satellite and satellite to ground links, Proc. SPIE 10565, International Conference on Space Optics—ICSO 2010, 105651F, Oct. 2010.

Yang et al., Modeling and Routing for Predictable Dynamic Networks, Tsinghua University, Bejing, China, IEEE, Aug. 17, 2018.

Iridium NEXT—Brochure (CHN), (2016) Iridium next The bold future of satellite communications, Brochure for Improvements to Iridium's network through Iridium NEXT satellite launches in Chinese, Jan. 17, 2018. (URL: https://www.iridium.com/resources/resource-download/?resource-id=306525).

Ananasso et al., Satellite systems for personal communication networks. Wireless Networks, 4(2), 1998, 155-165.

Uzunalioglu et al., A routing algorithm for connection-oriented Low Earth Orbit (LEO) satellite networks with dynamic connectivity. Wireless Networks, vol. 6, 181-190, May 2000.

* cited by examiner

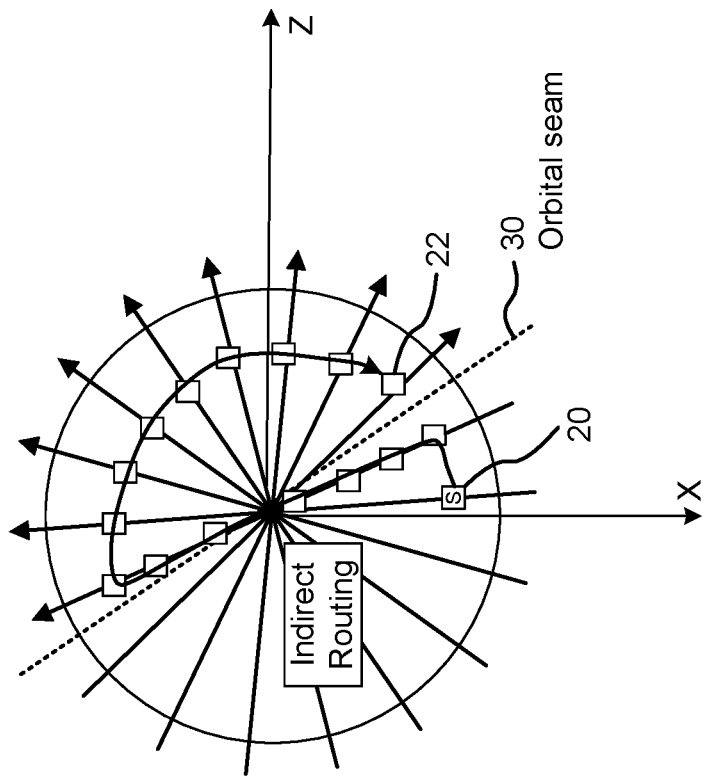
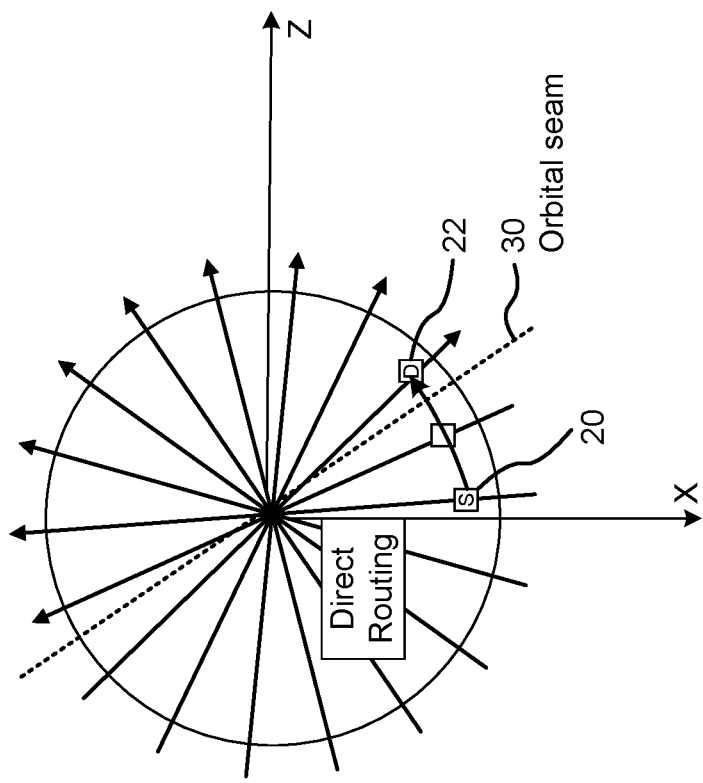

METHODS AND APPARATUSES FOR SATELLITE CONNECTIVITY ACROSS AN ORBITAL SEAM

FIELD

The present invention pertains to the field of telecommunications and in particular to methods and apparatuses for enabling satellite connectivity across an orbital seam in a satellite network.

BACKGROUND

It is known that satellite networks can be subcategorized based on their orbit altitude. The subcategorizations can include geostationary earth orbit (GEO), medium earth orbit (MEO) and low earth orbit (LEO).

While GEO satellites are stable to the side of the earth they are facing, MEO and LEO satellites are considered to be mobile with respect to a period of time, for example, MEO and LEO satellites meet at the same point of the earth after a specific time period which is dependent on the altitude of the satellites. GEO satellites are located approximately 22,236 miles (35,786 kilometers) above Earth's equator, wherein this altitude is considered to be a suitable location for monitoring weather and surveillance. Due to the high altitude of these satellites and long the round trip delay, namely the time for the signals to reach the satellites and return to Earth, GEO satellites are not considered to be an appropriate option for broadband, low delay data networks. LEO satellites however, can provide global coverage over Earth and are capable of reusing frequencies more effectively. LEO satellite networks can provide ubiquitous connectivity with low latency. However, a characteristic of LEO satellite networks is that many satellites are needed to provide global coverage, which is primarily due to the low altitude of the individual satellites.

In satellite communication technologies, a satellite constellation is defined as a group of satellites with coordinated ground coverage and shared control rotating in LEO orbits. There are two main LEO satellite constellations namely a "polar constellation" and a "walker delta constellation". A walker delta constellation provides a more uniform coverage over Earth almost everywhere except at the poles where no coverage is provided. A polar constellation however provides a dense coverage over the poles and a less dense coverage over the equator. FIG. 1 illustrates an example of a polar orbit constellation, wherein the solid lines 10 illustrate orbits of the satellites 15 and the dashed lines 20 illustrate inter-satellite links between satellites in different orbits.

The inter-satellite links (ISLs) are created between the satellites in the same orbits or between the satellites of neighboring orbits. In the former case, the ISLs are called an intra-orbit ISL and in the latter case the ISLs are called inter-orbit ISLs. The intra-orbit ISLs are relatively stable as the relative position of the satellites between each other changes very slowly over time. The inter-orbit ISLs are also stable links although the relative position of the satellites for inter-orbit links changes faster than the relative position of the satellites for intra-orbit links. However, there are two main differences between the inter-orbit ISLs and intra-orbit ISLs.

A first difference relates to the feature that before reaching the poles, i.e. both the north pole and the south pole, inter-orbit ISLs need to be broken and re-established after passing a pole. This is necessary because neighboring satellites on the east and west of each satellite switch their position as their orbits cross. For example, a first satellite's neighboring satellite that was located on the west side of the first satellite will still be located on the west side of the first satellite after passing the pole, but west will have switched from the left side of the satellite to the right side after passing, for instance, the north pole. Similarly, the first satellite's neighboring satellite that was on the east side of the first satellite will still be on the east side of the first satellite after passing the pole, but east will be left instead of right. Therefore, before reaching each of the poles, the inter-orbit ISLs need to be broken and after passing the pole subsequently re-established with opposite interfaces as before.

Secondly, for polar constellations, the satellites of each orbit are moving in the same direction. In such situations, there are two adjacent polar orbits that travel around Earth in different directions. These two adjacent polar orbits are termed seam orbits, as the region between these two adjacent orbits can be defined as an orbital seam. Maintaining cross connectivity between the satellites in seam orbits can be difficult. This is due to many factors including high relative velocity of the satellites in these adjacent orbits, namely pairs of satellites each in a respective orbit on either side of the orbital seam. Further factors can include substantial pointing, signal acquisition and tracking delay as well as a short link lifetime.

As such, across the orbital seam, typically either the inter-orbit ISLs are not established, e.g. there is a permanent disconnectivity between satellites across the seam, or the inter-orbit ISLs need to be established and broken frequently. It is known in the prior art that communication between satellites on opposite sides of the orbital seam is dealt with by avoiding the routing of communication traffic over the orbital seam. As illustrated in FIG. 2A, the shortest path between a source satellite 20 and a destination satellite 22 may be across the orbital seam 30. However, it is possible to route communication traffic to avoid unstable links at the orbital seam crossing. FIG. 2B illustrates the routing of communication traffic from a source satellite 20 to a destination satellite 22 in a manner that avoids crossing the orbital seam 30. It is noted that FIG. 2B is a polar plot to illustrate routing across the orbital seam via a stable over-the-pole connection assuming that all satellites are in one hemisphere. It is also noted that the ISLs within an orbit are stable, as they are intra-orbit links on the same side of the orbital seam. As illustrated in FIG. 2A, it is clear that the most direct route for communication is across the orbital seam and this route for communication would require transmission via only one intermediate satellite. However, as illustrated in FIG. 2B, the indirect route requires routing from the source satellite to a seam orbit satellite subsequently routing the communication over the pole and then along stable links to the destination satellite. As illustrated in FIG. 2B, the communication, for example the transmission of information packets, traverses fourteen intermediate satellites or satellite nodes or nodes, wherein each traversal will have associated therewith a transmission delay. The indirect routing as illustrated in FIG. 2B is clearly sub-optimal and can especially be detrimental for low latency applications. It will be further understood that the distance travelled by the information packets can vary depending on the actual path used as the indirect route.

Communication between satellites can use free space optical (FSO) communication which is an optical communication technology that uses light propagating in free space to wirelessly transmit data for telecommunications or computer networking. "Free space" can refer to air, outer space, vacuum, or a similar medium. FSO communication can include a line of sight optical wireless communication system that includes a transmitter, propagation channel and a receiver. The electrical (data) signal modulates the optical source which is usually a light-emitting diode (LED) or injected laser diode (ILD). When the channel, or free space continuum, is a vacuum it can be considered to be free from atmospheric losses. The receiver includes receiving lenses, photodiode and low pass filters for example. As an example, inter satellite communication employing an optical link was successfully achieved in March 2003 at a data rate of 50 Mbps with a signal wavelength of 850 nm and an optical signal with the power of 120 mW. In addition, an optical link between two LEO orbiting satellites, Terra SAR-X and NFIRE, was established at 5.5 Gbps at a total distance of 5500 km and at a relative speed between the satellites of 25,000 km/hr in 2008.

As is known, optical ISL challenges can include point-ahead-angle, Doppler shift, satellite vibration, tracking and background noise sources. One of the challenges for the establishment of an optical ISL is acquisition, tracking and pointing (ATP). For an optical ISL to be established, the satellites which can be defined at the communication nodes or satellite nodes, need to point their respective transmitters/receivers towards each other so that the receiver of a transmission detects the maximum optical power in its receiver. This ATP process can be a time consuming process which is performed in multiple phases. In a first phase, the satellites perform coarse pointing by searching the space in a predefined uncertainty cone. An example of an uncertainty cone is illustrated in FIG. 3 and can also be defined as a field of view 32 of a satellite, terminal or communication node. The pointing can be performed as illustrated in FIG. 3 by the solid line 34, wherein the searching can be performed within the uncertainty zone 36 which covers the uncertainty cone of the respective satellite. After the coarse tuning, the fine tuning starts where the transmitter and receiver perform further tuning in order to improve the accuracy of the pointing. Due to relative motion of the satellites with respect to each other, the pointing typically needs to be corrected over time. In addition, due to latency of an ISL, the pointing should be corrected so that at the time the transmission from a source satellite reaches the receiver of a destination satellite, the receiver receives substantially a maximum optical power. This process is called point ahead which is part of a tracking procedure. Spatial locking of the optical transmission beams may not be sufficient for an ISL to be established. Signal acquisition can also be necessary and can be performed by locking the phase of the transmitted optical signal and the received optical signal. This phase locking can be performed using a phase-locked loop (PLL) system.

Depending on the use case of the FSO communication, a number of different ATP mechanisms have been proposed. FIG. 4 illustrates a summary of the ATP mechanisms proposed for FSO communication. ATP mechanisms can include gimbal based mechanisms, mirror based mechanisms, gimbal and mirror based mechanisms, adaptive optic mechanisms, liquid crystal mechanisms, radio frequency (RF)-FSO hybrid mechanisms and other ATP mechanisms as would be readily understood by a worker skilled in the art.

Design parameters in FSO communication system design can include one or more of laser power, coverage distance (e.g. distance between the satellites or communication nodes or satellite nodes), modulation type, lens size, detection method, data rate, acceptable bit error rate (BER), quality factor (Q factor) and other design parameters as would be readily understood. In addition, ATP process latency can be dependent on FSO communication system parameters which may include distance, laser power, data rate, and other factors as would be readily understood. ATP measurements based on a measurement report has reported link acquisition between Alphasat TDP1 and Sentinel-1A can be reliably and repeatability achieved within less than 50 seconds, wherein the GEO-LEO link is approximately 42000 km. In another example, in 2010, spatial acquisition and frequency acquisition was performed in 22 seconds on NFIRE and in 34 seconds on TerraSAR-X, wherein the link distances were 3,700 km and 4,700 km, respectively. Based on these reported numbers, the ATP mechanism latency is not deterministic and can be considered random and dependent on many factors including the method of pointing used, position of the satellites, satellites Tx/Rx.

As such, latency for communication links between satellites is known and thus in order to attempt reduce latency of communications, direct routing may be more desired rather than indirect routing for communications between satellites on opposite sides of an orbital seam or seam.

Accordingly, there may be a need for methods and apparatuses for enabling satellite communication across a seam that is not subject to one or more limitations of the prior art.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

An object of embodiments of the present invention is to provide methods and apparatuses for satellite connectivity across an orbital seam.

According to an aspect of the present invention, there is provided a method for satellite communication across one or more orbital seams, the one or more orbital seams located between a first set of satellites having plural satellites and a second set of satellites having plural satellites. The method includes alternatingly assigning the plural satellites of the first set into two or more groups of satellites and alternatingly assigning the plural satellites of the second set into the two or more groups of satellites. The method further includes initiating acquisition, tracking and pointing (ATP) between a first satellite and a second satellite to establish communication between the first satellite and the second satellite, the first satellite and the second satellite having a first orbital seam between their respective orbits, the first satellite and the second satellite in a first group of satellites of the two or more groups, wherein a satellite in the first group of satellites only communicates with other satellites in the first group of satellites, wherein communication between the first satellite and the second satellite occurs during an inter-satellite link (ISL) lifetime. The method further includes initiating ATP between a third satellite and a fourth satellite to establish communication between a third satellite and a fourth satellite, the third satellite and the fourth satellite in a second group of satellites, the third satellite and the fourth satellite having a second orbital seam between their respective orbits. At least upon establishment of communication between the third satellite and the fourth satellite, the method further includes actively terminating communication between the first satellite and the second satellite prior to an end of the ISL lifetime, thereby enabling each of the first satellite and the second satellite to initiate ATP with another satellite in the first group of satellites prior to the end of the ISL lifetime.

In some embodiments, a satellite in the second group of satellites only communicates with other satellites in the second group of satellites. In some embodiments, the third satellite and the fourth satellite have an established communication link until the end of the ISL lifetime.

In some embodiments, assigning the plural satellites of the first set of satellites and assigning the plural satellites of the second set of satellites is performed based on one or more of dynamics of topology, link acquisition time and link lifetime. In some embodiments, the dynamics of topology include one or more characteristics of a satellite including size, speed, altitude, constellation density, number of satellites per orbit and orbital shell.

In some embodiments, at least one pair of satellites in one of the two or more groups of satellites has an established communication link. In some embodiments, initiating ATP between a pair of satellites in a particular group of satellites of the two or more groups is off set from initiating ATP between another pair of satellites in another particular group of satellites of the two or more groups.

In some embodiments, the method further includes adjusting signal power associated with one or more of the first satellite and the second satellite to maintain communication between the first satellite and the second satellite to ensure completion of ATP between another pair of satellites prior to the end of the ISL lifetime.

According to an aspect of the present invention, there is provided an apparatus for satellite communication across one or more orbital seams, the one or more orbital seams located between a first set of satellites having plural satellites and a second set of satellites having plural satellites. The apparatus includes a processor and a non-transient memory for storing instructions. The instructions, when executed by the processor cause the apparatus to be configured to alternatingly assign the plural satellites of the first set into two or more groups of satellites and alternatingly assign the plural satellites of the second set into the two or more groups of satellites. The instructions, when executed by the processor further cause the apparatus to be configured to initiate acquisition, tracking and pointing (ATP) between a first satellite and a second satellite to establish communication between the first satellite and the second satellite, the first satellite and the second satellite having a first orbital seam between their respective orbits, the first satellite and the second satellite in a first group of satellites of the two or more groups, wherein a satellite in the first group of satellites only communicates with other satellites in the first group of satellites, wherein communication between the first satellite and the second satellite occurs during an inter-satellite link (ISL) lifetime. The instructions, when executed by the processor further cause the apparatus to be configured to initiate ATP between a third satellite and a fourth satellite to establish communication between a third satellite and a fourth satellite, the third satellite and the fourth satellite in a second group of satellites, the third satellite and the fourth satellite having a second orbital seam between their respective orbits. Upon establishment of communication between the third satellite and the fourth satellite, the instructions, when executed by the processor further cause the apparatus to be configured to actively terminate communication between the first satellite and the second satellite prior to an end of the ISL lifetime, thereby enabling each of the first satellite and the second satellite to initiate ATP with another satellite in the first group of satellites prior to the end of the ISL lifetime.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2A illustrates direct routing of communication across an orbital seam.

FIG. 2B illustrates indirect routing of communication across an orbital seam.

DETAILED DESCRIPTION

Figure 1:
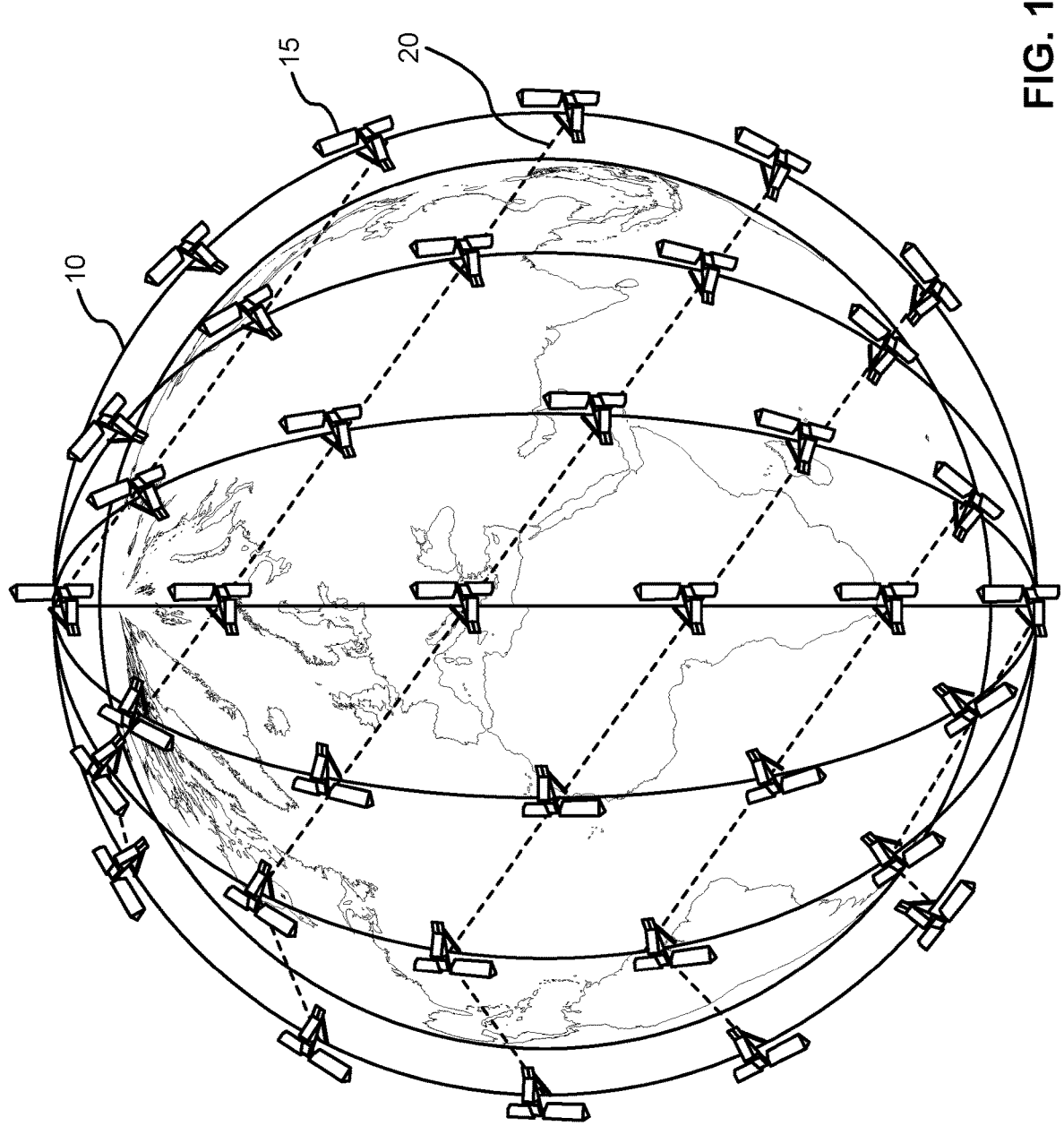
FIG. 1 illustrates a collection of polar satellite constellations.
Figure 3:
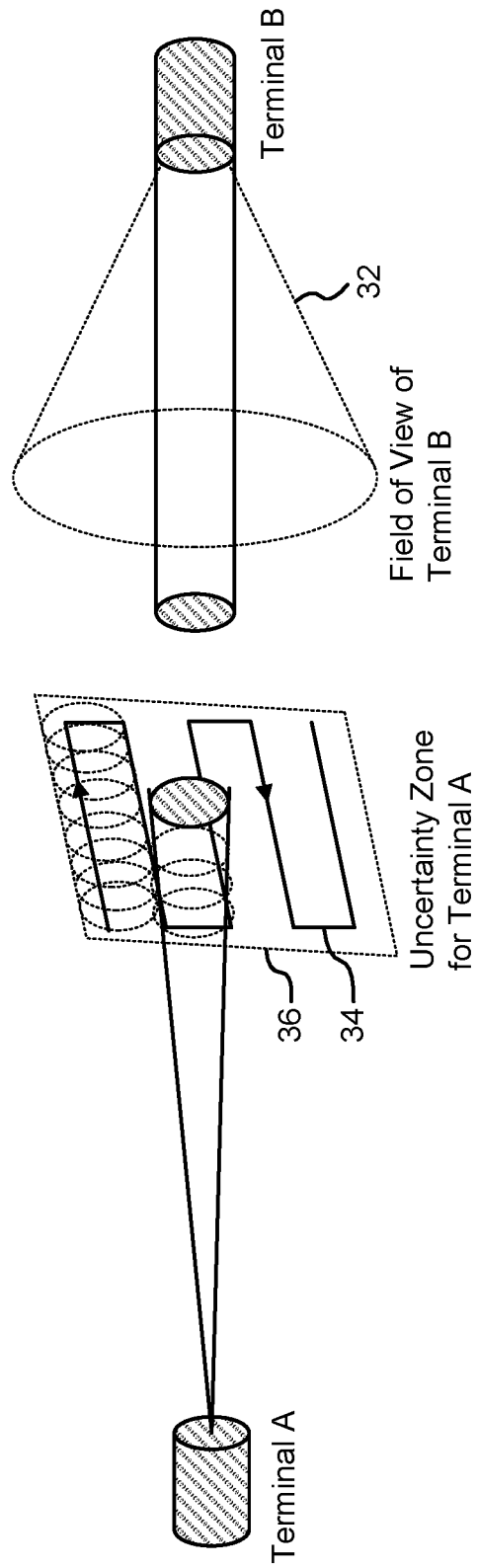
FIG. 3 illustrates a pointing procedure for optical alignment for inter satellite communication.
Figure 4:
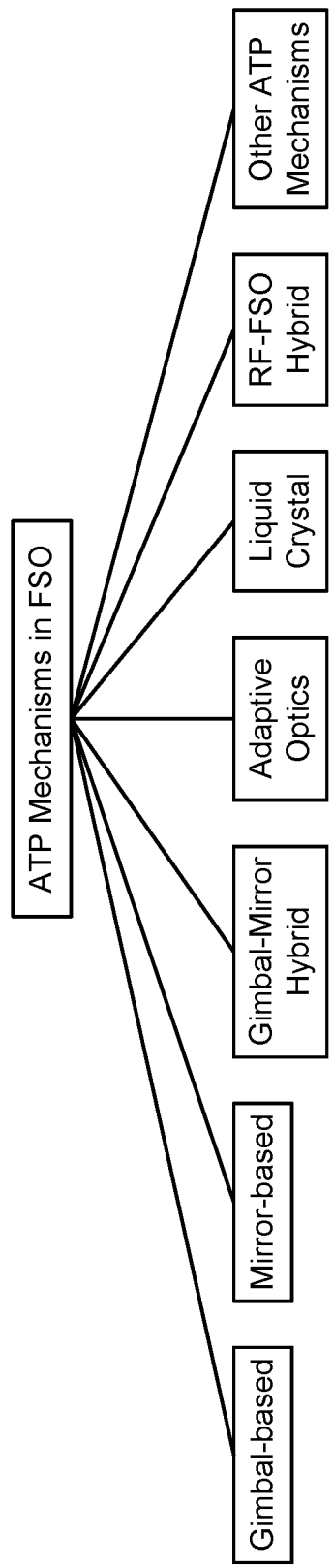
FIG. 4 illustrates examples of acquisition, tracking and pointing (ATP) mechanisms for free space optic (FSO) communication.

There are provided methods and apparatuses for enabling satellite communication across an orbital seam thereby at least in part improving network latency. According to embodiments, methods and apparatuses are provided to improve network connectivity of satellite networks, where satellite mobility together with long signal acquisition times reduce reliable communication across an orbital seam in a satellite network. According to embodiments, the methods and apparatuses apply to non-terrestrial, for example satellite, constellation networks configured to provide global communications services, wherein these communications services may not be supported by terrestrial networks, for example wire-based or fibre-based networks.

For example, in a polar constellation, intra-orbit ISLs are relatively stable. Inter-orbit ISLs are also relatively stable except at the poles and at an orbital seam. At an orbital seam, the inter-orbit ISLs are broken after a short interval of time and subsequently the satellites on opposite sides of the orbital seam commence an ATP procedure in order to re-establish communications therebetween.

Other satellite constellation configurations can also result in a situation wherein satellites within a constellation in particular orbits thereof pass each other in non parallel orbits and as such there is a form of a "seam" therebetween. In this configuration, a "seam" can be defined to be present where these satellites are able to establish a connection however this connection can only be maintained for a short period of time. An example of such a constellation is a Walker Delta Pattern constellation. A Walker-Delta constellation pattern contains of total of 't' satellites in orbital planes with s=t/p satellites in each orbital plane. All orbital planes are assumed to be in a same inclination 'i' with reference to the equator. The phase difference between satellites in adjacent planes is defined as the angle in the direction of motion from the ascending node to the nearest satellite at a time when a satellite in the next most westerly plane is at its ascending node. It can be defined that for a Walker Delta pattern, an orbital seam can be essentially diffused over a portion of or the entire constellation. As such, the term "orbital seam" or "seam" can be used to define a situation in a constellation wherein satellites are able to establish a connection therebetween however this connection can only be maintained for a short period of time.

Across an orbital seam, ATP procedure latency can be considered to be random and can take a substantial period of time relative to the connectivity time for satellites on opposite sides of the orbital seam. For example, if all of the satellites located on opposite sides of a seam start ATP at around the same time, there is substantially complete disconnectivity of communications between the two sides of the orbital seam. In this case, the only possible communication paths between satellites on opposite sides of the orbital seam is for the communication pathway to go via a pole, for example an indirect routing pathway as illustrated in FIG. 2B, which can be costly in terms of bandwidth and delay. Furthermore, this indirect routing of communications may cause traffic congestion at the pole satellites since all the traffic from both sides of the orbital seam travels via the pole satellites and may additionally or alternately cause an increase in communication delay since communication traffic for satellites on opposites sides of the seam travels to the poles and back. For example, for satellites at the equator located on opposite sides of the seam, communication traffic travels from the equator to a pole and subsequently back to the equator on the other side of the orbital seam, resulting in a undesired latency in communication between the satellites on opposite sides of an orbital seam and located in the region of the equator.

Based on the communication system parameters, it is known or understood that ISL connectivity time is not controllable since ATP time is not deterministic. However, it has been realised that ISL disconnectivity can be controlled, for example satellites can break their ISLs at any time. It has been realised that there may be defined an upper bound for the ATP mechanism latency, for example a maximum time that ATP would take for connectivity purposes, however defining an upper bound for ATP does not necessarily improve the ISL connectivity time. It can be determined that orbital seam or seam ISL can have a lifetime which is at least in part determined by the relative distance between the associated satellites or satellite nodes. As the satellites move away from each other an ISL therebetween becomes weaker and weaker until a defined threshold associated with the bit error rate (BER) for the ISL is exceeded. Accordingly, the duration of the time that two satellite nodes or satellites are in range such that ATP can be commenced until the time that the link cannot be maintained, for example BER is greater than a defined threshold, can be defined as the ISL lifetime.

According to embodiments, there is provided a method for satellite communication across an orbital seam, the orbital seam located between a first set of satellites having plural satellites and a second set of satellites having plural satellites. The method includes alternatingly assigning the plural satellites of the first set of satellites into two or more groups of satellites and alternatingly assigning the plural satellites of the second set of satellites into the two or more groups of satellites. The method further includes initiating communication between a first satellite and a second satellite, the first satellite in a first group of satellites of the two or more groups and the second satellite in the first group of satellites of the two or more groups, wherein a satellite in the first group of satellites only communicates with other satellites in the first group of satellites. In addition, the method includes terminating communication between the first satellite and the second satellite prior to an end of an inter-satellite link (ISL) lifetime.

According to embodiments, there is further provided an apparatus for satellite communication across an orbital seam, the orbital seam located between a first set of satellites having plural satellites and a second set of satellites having plural satellites. The apparatus includes a processor and a non-transient memory for storing instructions that when executed by the processor cause the apparatus to be configured to perform the method defined above.

In order to further define the technology with respect the present application, an example is used wherein the satellites are configured in polar constellations. According to some embodiments, it can be determined that based on the orbital seam ISL lifetime (denoted by L), an upper bound of ATP latency (denoted by D) and the number of satellites in each polar orbit (K), the satellites can be grouped into N groups of size M, wherein the relationship can be defined by Equation 1:

$$N \times M = K \qquad (1)$$

According to embodiments, in a sequence of N consecutive satellites there is one satellite from each group. A satellite can only connect, for example start ATP, with the satellites within the same group. According to embodiments, orbital seam satellite disconnectivity times can be scheduled such that at no time are all N consecutive satellites performing ATP. In other words, the scheduling can be configured such that at least one satellite from a group of satellites is not performing ATP.

Accordingly, by scheduling ISL disconnectivity of satellites as defined above, it can be determined that from each set of N consecutive satellites there is at least one connected to a peer satellite on the other side of the orbital seam at all times. Accordingly, connectivity across the seam can be provided at substantially all times.

It is assumed that each polar orbit includes K satellites or satellite nodes. Therefore, given the number of satellites in each orbit and the altitude of the satellites, the intra-orbit ISL time can be defined as the time it takes for a first satellite in the particular polar orbit to reach the previous position of the immediately preceding or second satellite in that particular polar orbit. The intra-orbit ISL time can be defined by T, wherein T can be determined based on Equation 2. It is noted that the orbit-time can be determined based on the altitude of the polar orbit being evaluated.

$$T = \frac{ORBIT\_TIME}{K} \quad (2)$$

For a particular satellite, the characteristics of the optical transceiver associated with the satellite, laser power generated by the satellite and other characteristics that can be dependencies of an ISL. In order to maintain a target BER, for example in order to keep the BER below a predefined threshold, the particular satellite will have a deterministic visibility angle which defines a visibility window of satellites in the polar orbit on the opposite side of the orbital seam. The visibility angle determines the ISL lifetime which is denoted by L. Using an ISL lifetime L, and intra-orbit ISL time T, the number of satellite groups that can be created can be determined based on Equation 3.

$$N = \left\lfloor \frac{L}{T} \right\rfloor \quad (3)$$

Figure 5:
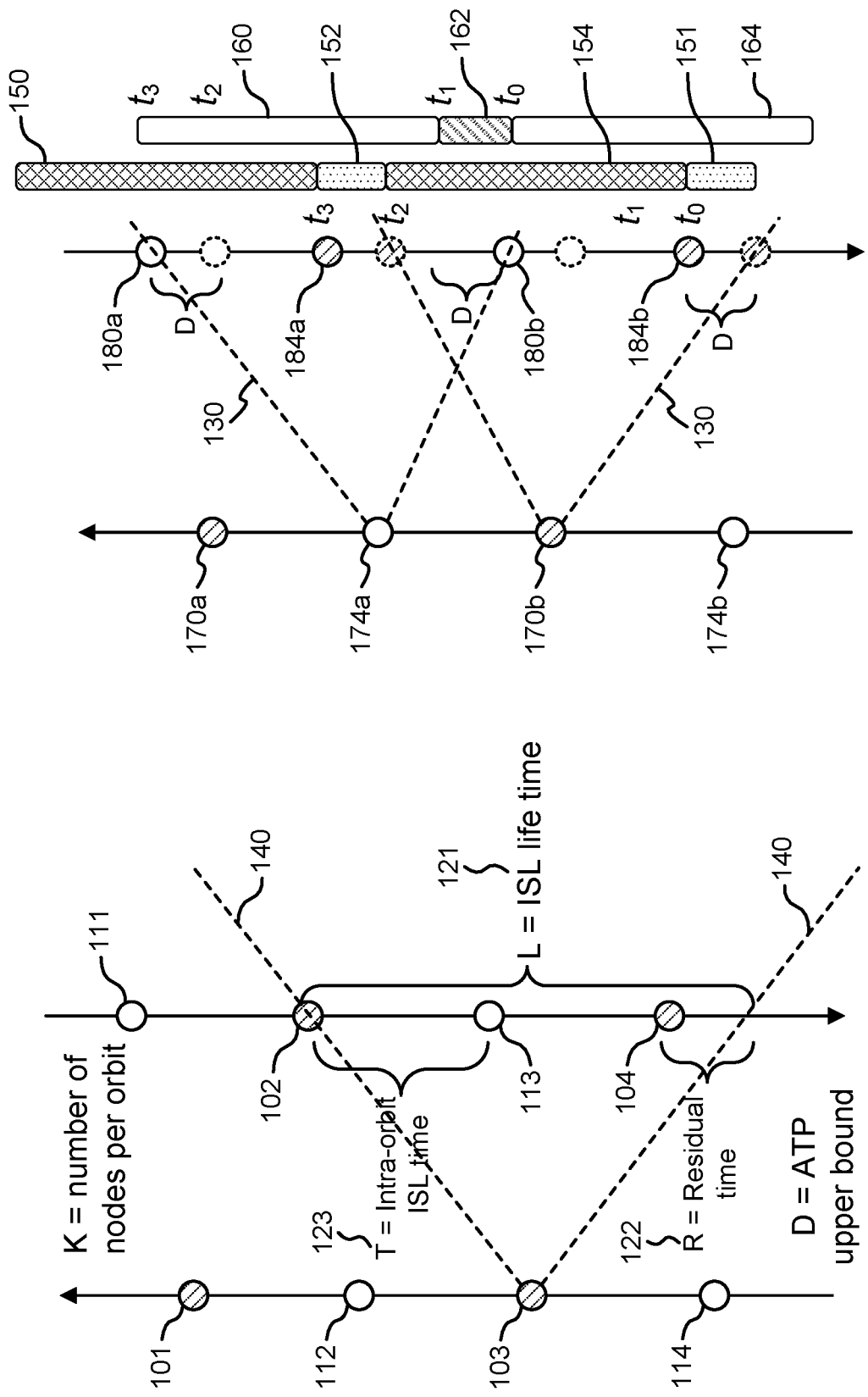
FIG. 5A illustrates connectivity between seam orbits across the orbital seam in accordance with embodiments.
FIG. 5B illustrates connectivity between seam orbits across the orbital seam in accordance with embodiments.

According to embodiments, reference is made to FIG. 5A which illustrates two polar constellations of satellites, wherein a first polar constellation, for example on the right side of the figure, is positioned on a first side of an orbital seam. These satellites of the first polar constellation are travelling towards the top of the page. A second polar constellation is located adjacent to the first polar constellation, on the opposite side of the orbital seam. The satellites in the second polar constellation are travelling towards the bottom of the page.

According to embodiments, the plural satellites of a first polar constellation are alternating assigned to two groups of satellites and the plural satellites of a second polar constellation are also alternatingly assigned to two or more groups of satellites. As illustrated in FIG. 5A, two groups of satellites in each polar constellation are created. For the first polar constellation, the first group includes satellites 101 and 103 and the second group includes satellites 112 and 114. For the second polar constellation, the first group includes satellites 102 and 104 and the second group includes satellites 111 and 113. It is understood that for the grouping of satellites as illustrated in FIG. 5A, Equation 1 above is to be respected and that M is a non-negative number greater than 1. According to embodiments, only the first group of satellites in each of the first polar constellation and the second polar constellation are permitted to communicate therebetween across the orbital seam, and as such, satellites 101, 102, 103 and 104 are permitted to communicate therebetween across the seam. In addition, only the second group of satellites in each of the first polar constellation and the second polar constellation are permitted to communicate therebetween across the orbital seam, and as such, satellites 111, 112, 113 and 114 are permitted to communicate therebetween across the seam.

Having regard to FIG. 5A, a particular satellite 103 has a visibility window 140 defined by the dashed lines. This visibility window 140 can define the inter satellite link (ISL) lifetime 121 denoted above as L. In some instances, the ISL lifetime can be defined as the time during which the BER of the ISL communication link is below a predefined threshold. The ISL lifetime defines a period of time during which satellite 103 is able to communicate with a satellite within the polar constellation on the other side of the orbital seam, for example satellite 102 which is just entering the visibility window 140 of satellite 103. The ISL lifetime includes the time required for the two satellites (i.e. satellite 102 and satellite 103) to perform acquisition, tracking and pointing (ATP) in order to establish a communication session or communication link therebetween. The ISL lifetime further includes the time that communication between the satellites is possible.

Having further regard to FIG. 5A, a residual time R 122 can be defined as a portion of inter satellite communication time (i.e. ISL lifetime) that is wasted upon active termination of the communication link between the satellites. R can be defined by Equation 5, wherein L 121 is the inter-satellite ISL time, N is the number of groups of satellites and T 123 is the intra-orbit ISL time, which can be defined as the time it takes for a first satellite in the particular polar orbit to reach the previous position of the immediately preceding satellite in that particular polar orbit. With reference to FIG. 5A, T 123 is the time that it takes for satellite 102 to reach to position of satellite 113. The residual time can be defined as:

$$R = L - N \times T \quad (5)$$

According to embodiments, a configuration of satellite communication timing can be defined such that the residual time is equivalent to the upper bound for ATP latency (e.g. R=D). As previously noted, the upper bound for ATP latency can define essentially an upper limit for the period of time for ATP to be performed in order for satellites to communicate. If one considers a situation where satellites 103 and 104 break the ISL communication link therebetween D seconds earlier than the end of the link lifetime, satellites 112 and 113 can maintain their ISL link therebetween until the end of the link lifetime associated with satellites 103 and 104. Therefore, when the satellite 103 and 104 break the ISL link therebetween and commence a ATP with their respective new peer satellites (namely a new satellite within the same group of satellites), the new peer satellites can be essentially at the start of a new link lifetime. During the period of time that the ATP process is being performed to establish an ISL link between the new respective peer satellites of satellites 103 and 104, satellites 113 and 114 maintain their associated ISL link and thus communication across the orbital seam is maintained. After D seconds typically the ISL link between satellites 103 and 104 and their new respective peer satellites have been established and the ISL link between satellites 113 and 114 can be terminated in order for satellites 113 and 114 to perform ATP with their respective new peer satellites.

Reference is made to FIG. 5B which illustrates a timeline of actions of the satellites in accordance with embodiments. During time period 151 satellite 184*b* is performing ATP and after D seconds 130, an ISL link between satellites 184*b* and 170*b* is established at time $t_0$. At time $t_0$ the ISL link between satellite 180*b* and satellite 174*b* is at the end of the associate ISL lifetime and this ISL link can be actively terminated. Subsequently, during time period 162 satellite 180*b* commences ATP with satellite 174*a*. It is noted that during time period 164 satellite 180*b* and 174*b* are in communication and thus there is an ISL communication across the orbital seam during the performance of ATP between satellite 184*b* and satellite 170*b*.

With further reference to FIG. 5B, at time $t_1$, subsequent to time period 162, satellites 180*b* and 174*a* have an established ISL communication link, wherein it is noted that satellites 184*b* and 170*b* have an ISL communication link during time period 154, which extends prior to time $t_0$ and after time $t_1$. In addition, at time $t_2$, the ISL communication link between satellites 184*b* and 170*b* reaches the respective ISL lifetime and can be subsequently terminated enabling satellite 184a to commence ATP with satellite 170a.

This process as defined above can proceed wherein when satellites of a first group are performing ATP, for example time periods 151, 162 and 152, satellites in a second group have an established ISL communication link, for example time period 164, 154 and 160. In this manner, communication across the orbital seam may be maintained thus reducing latency of communications across the orbital seam.

According to embodiments, dropping or terminating an ISL communication link D seconds before the ISL lifetime can be performed for a first group of satellites which can be used to perform ATP with a peer satellite in the first group of satellites. For the second group of satellites, the ISL communication link can be maintained until the end of the ISL lifetime. Subsequently the satellite of the second group of satellites can commence start ATP with peer satellite in its respective group, this peer satellite is already inside the visibility region for R second which is greater than D.

Figure 6:
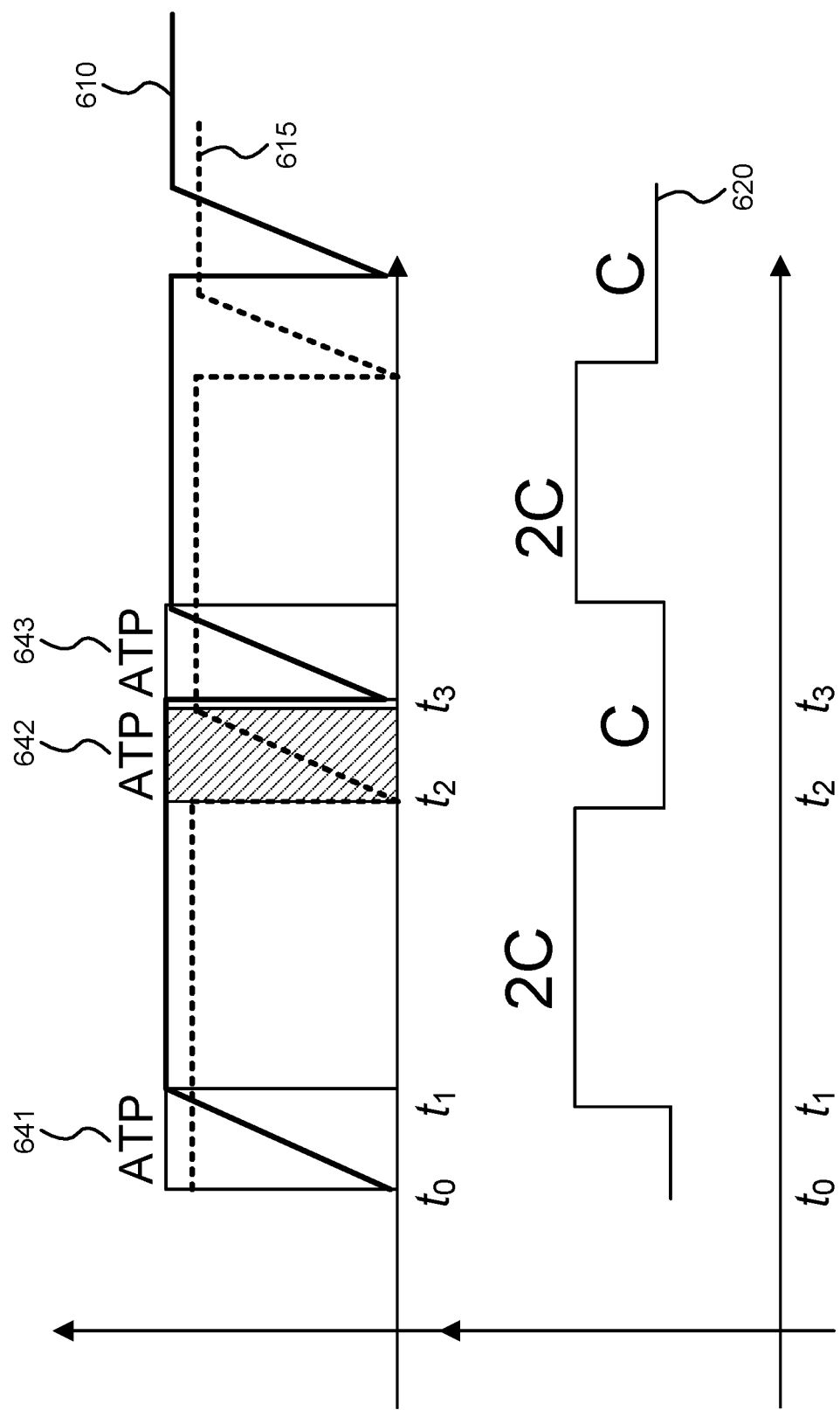
FIG. 6 illustrates communication capacity across the orbital seam in accordance with embodiments.

According to embodiments, a capacity analysis at the orbital seam can be illustrated as shown in FIG. 6. As illustrated, the capacity of a first group of satellites is illustrated by 610 and the capacity of a second group of satellites is illustrated by 615. During time periods 641 and 643, ATP is being performed by satellites of within the first group of satellites during which the second group of satellites have an operational ISL communication link. During time period 642, the first group of satellites have an operation ISL communication link. As illustrated, the capacity of the communication link(s) 620 across the orbital seam, transition between C and 2C depending on the operation characteristics of the ISL communication links associated with the first and second group of satellites.

Figure 10:
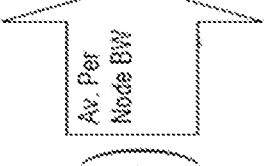
FIG. 10 illustrates available bandwidth across the orbital seam, according to embodiments.

According to embodiments, due to the early termination of an ISL communication link, considering N×T seconds, D seconds are wasted for ATP and thus, for each sequence of N nodes or satellites, the available bandwidth across the orbital seam can be determined by FIG. 10.

Figure 7:
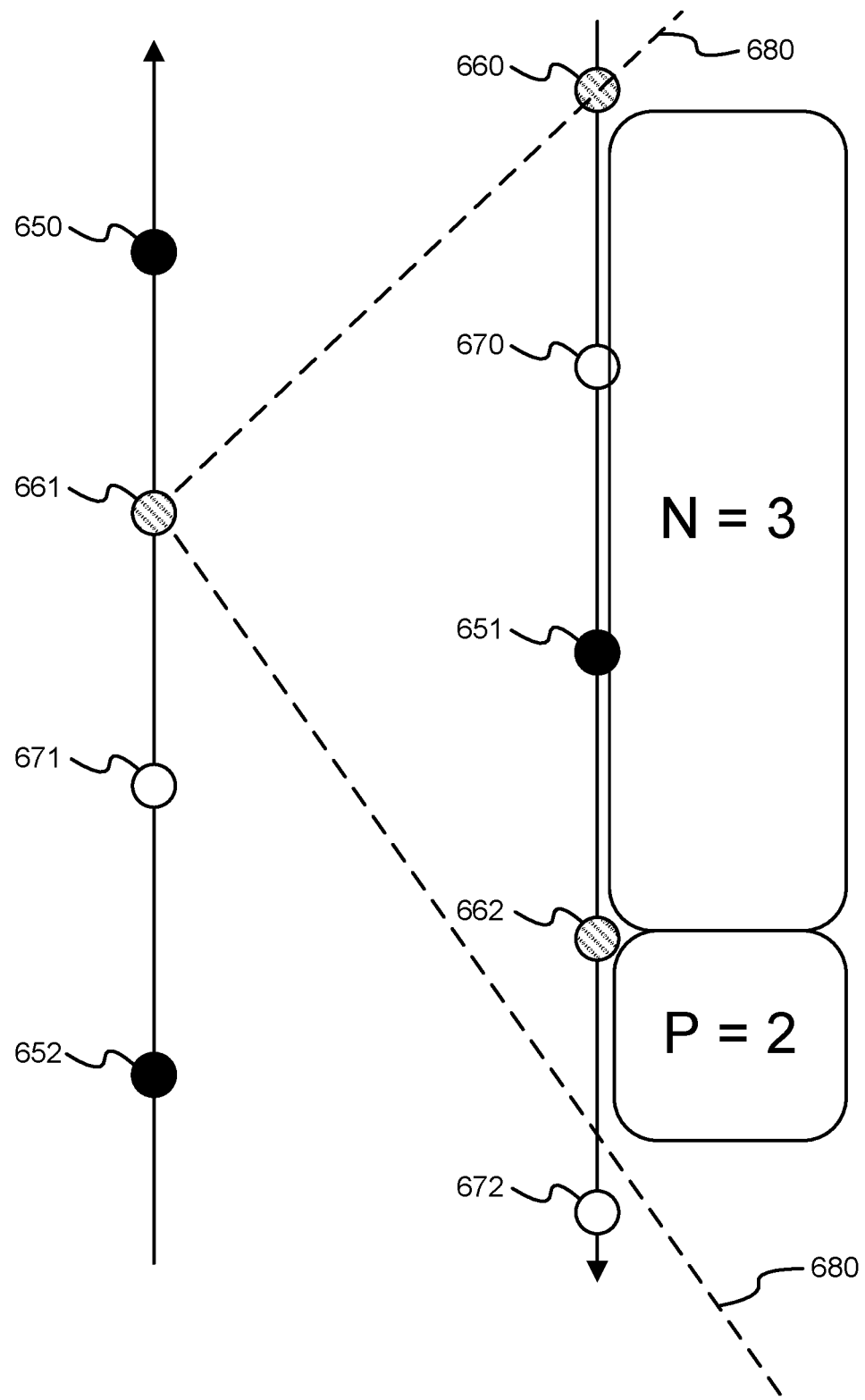
FIG. 7 illustrates connectivity between seam orbits across the orbital seam in accordance with embodiments.

According to embodiments, the plural satellites of a first polar constellation are alternating assigned to three groups of satellites and the plural satellites of a second polar constellation are also alternatingly assigned to three groups of satellites. FIG. 7 illustrates connectivity between seam orbits across the orbital seam in accordance with embodiments. In FIG. 7 the satellites in the seam orbits are assigned to three different groups, as such N=3. In this configuration, satellites 660, 661 and 662 are configured for communication therebetween. Satellites 670, 671 and 672 are configured for communication therebetween. Finally satellites 650, 651 and 652 are configured for communication therebetween. As illustrated in FIG. 7 the visibility window 680 of satellite 661 includes at least one satellite from each of the three groups as well as, in some instances, a second satellite from the group to which satellite 661 is assigned.

According to embodiments, P is defined as the minimum number of non-overlapping ATP times in the residual time and P can be calculated as defined in Equation 7.

$$P = \left\lfloor \frac{R}{D} \right\rfloor \quad (7)$$

According to embodiments, P≥1. If there are N groups of satellites, and P is greater than 1, there may be P empty spots of ATP for N groups of satellites. In this scenario, there is a need to schedule the N groups into P, ATP times. In one embodiment N groups can be randomly distributed into P non-overlapping ATP times. In another embodiment the N groups can be distributed into the P slots in a uniform fashion, wherein a uniform distribution can provide smoother capacity distribution among the N groups of satellites.

According to embodiments, there are multiple technical benefits or advantages of the method and apparatus according to embodiments. For example, the method and apparatus of the instant application can provide continuous connectivity across the orbital seam. The method and apparatus can provide a predictable link state. In some embodiments, the method and apparatus can be used in predictive routing configurations. These predictive routing configurations can be configured based on an almanac that can define status and low-resolution orbital information for each satellite. According to some embodiments, the method and apparatus enables configuration for different system setups and different polar satellite constellations and configurations thereof.

In addition, a further technical benefit or advantage the method and apparatus according to embodiments, can be an ATP latency reduction and higher seam capacity, which can result in less bandwidth wasted. This can be determined as defined by Equation 8.

$$B_n = C\left(1 - \frac{ATP}{NT}\right) \quad (8)$$

A further technical benefit or advantage the method and apparatus according to embodiments, may include for example in some instances zero ATP timing which can result in 100% orbital seam communication capacity. According to some embodiments, a larger number of groups of satellites into which the plural satellites of the polar constellations are assigned, can provide more network capacity. However, more groups of satellites may require more laser power.

While portion of the above discussion is directed towards communication across an orbital seam which can be defined in a polar constellation of satellites, it will be readily understood how to apply the above teachings for communication across an orbital seam for other constellation configurations. These other constellation configuration can include for example a Walker Delta constellation or other constellation configurations which can include an "orbital seam" or "seam" which can be used to define a situation wherein satellites are able to establish a connection therebetween however this connection can only be maintained for a short period of time.

Figure 8:
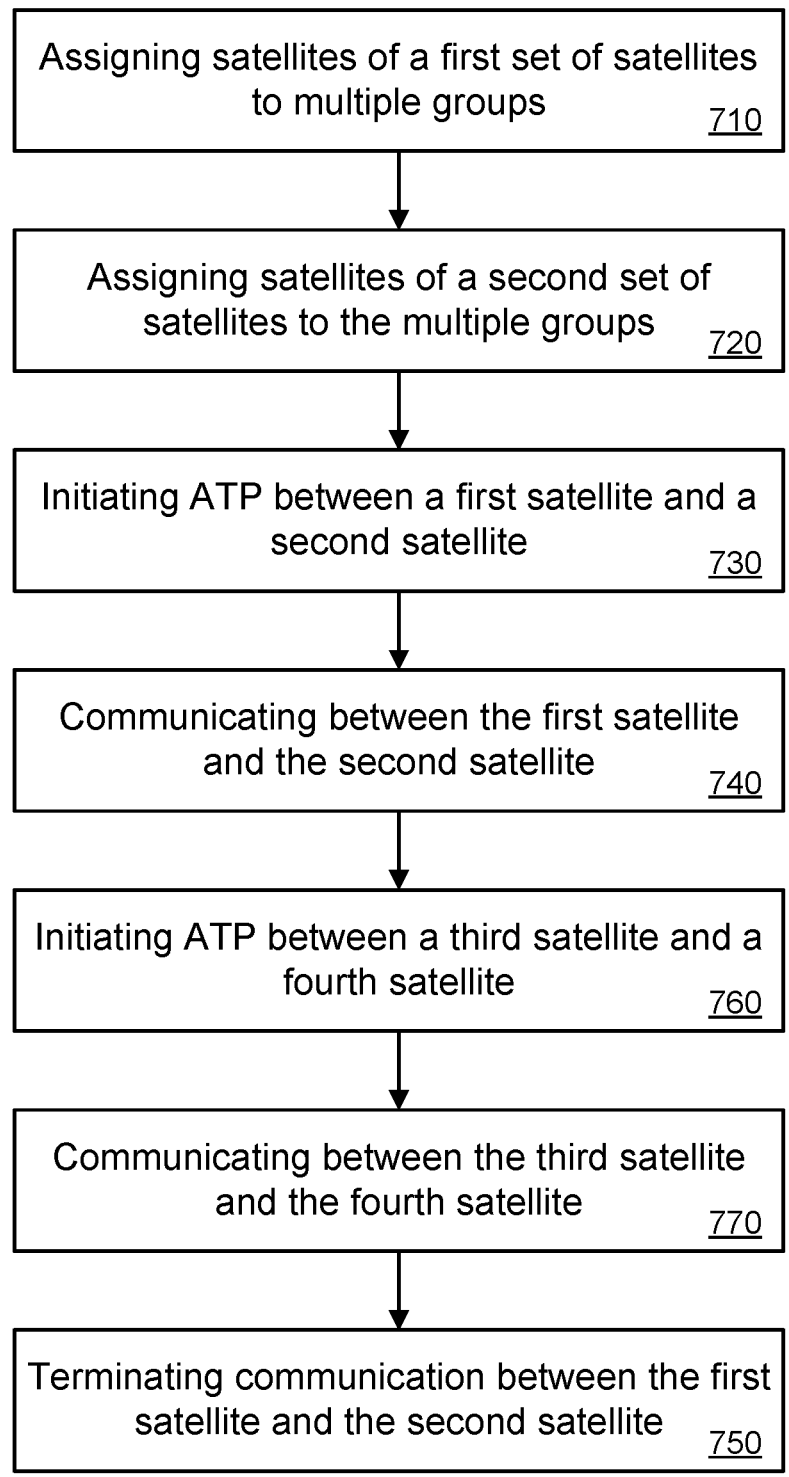
FIG. 8 illustrates a method for communication across the orbital seam in accordance with embodiments.

FIG. 8 illustrates a method for satellite communication across an orbital seam in accordance with embodiments. The orbital seam located between a first polar satellite constellation having plural satellites and a second polar satellite constellation having plural satellites. The method includes alternatingly assigning 710 the plural satellites of the first polar constellation into two or more groups of satellites and alternatingly assigning 720 the plural satellites of the second polar constellation into the two or more groups of satellites. The method further includes initiating acquisition, tracking and pointing (ATP) 730 between a first satellite and a second satellite, the first satellite in a first group of satellites of the two or more groups and the second satellite in the first group of satellites of the two or more groups, wherein a satellite in the first group of satellites only communicates with other satellites in the first group of satellites. Furthermore, communication 740 between the first satellite and the second satellite occurs during an inter-satellite link (ISL) lifetime. The method further includes initiating ATP 760 between a third satellite and a fourth satellite to establish communication between a third satellite and a fourth satellite, the third satellite and the fourth satellite in a second group of satellites. At least upon establishment of communication 770 between the third satellite and the fourth satellite, terminating communication 750 between the first satellite and the second satellite prior to an end of the ISL lifetime, thereby enabling each of the first satellite and the second satellite to initiate ATP with another satellite in the first group of satellites.

According to embodiments a satellite in the second group of satellites only communicates with other satellites in the second group of satellites.

In some embodiments, the ISL communication link between the third satellite and the fourth satellite continues until the end of the inter-satellite link time. According to embodiments, the third satellite and the fourth satellite have an established communication link prior to terminating communication between the first satellite and the second satellite.

In some embodiments, assigning the plural satellites of the first polar constellation and assigning the plural satellites of the second polar constellation is performed based on one or more of dynamics of topology, link acquisition time and link lifetime. The dynamics of topology can include one or more characteristics of a satellite including size, speed and physical characteristics.

According to embodiments, at least one pair of satellites in one of the two or more groups of satellites has an established communication link.

According to embodiments, initiating communications between a pair of satellites in a particular group of satellites of the two or more groups is staggered or off-set in time from initiating communication between another pair of satellites in another particular group of satellites of the two or more groups.

According to embodiments, the method further includes adjusting laser power associated with one or more of the satellites that are initiating communications in order to enable or ensure that these satellites have visibility of each other during the ISL lifetime.

Figure 9:
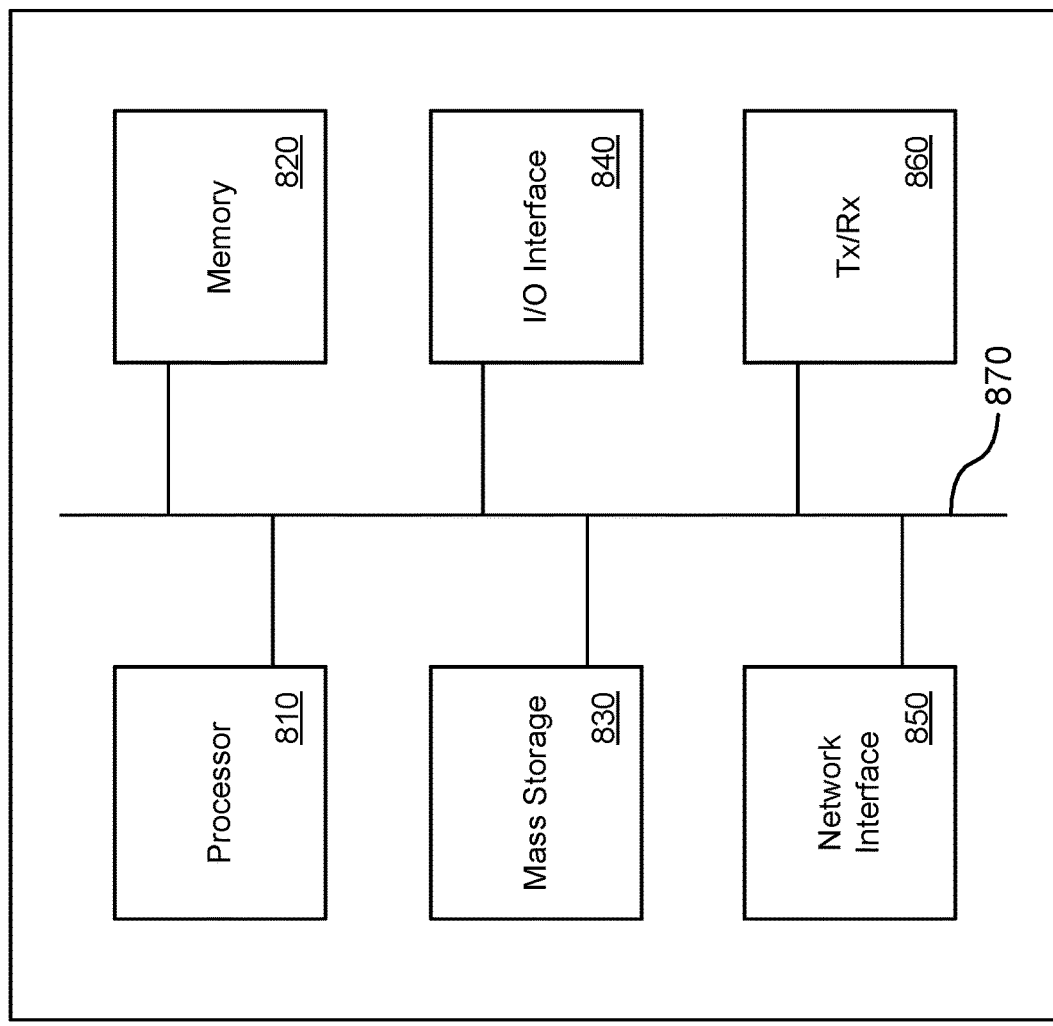
FIG. 9 is a schematic diagram of an electronic device according to embodiments.

FIG. 9 is a schematic diagram of an electronic device 800 that may perform any or all of the steps of the above methods and features described herein, according to different embodiments of the present invention.

As shown, the device includes a processor 810, memory 820, non-transitory mass storage 830, I/O interface 840, network interface 850, and a transceiver 860, all of which are communicatively coupled via bi-directional bus 870. According to certain embodiments, any or all of the depicted elements may be utilized, or only a subset of the elements. Further, the device 800 may contain multiple instances of certain elements, such as multiple processors, memories, or transceivers. Also, elements of the hardware device may be directly coupled to other elements without the bi-directional bus.

The memory 820 may include any type of non-transitory memory such as static random access memory (SRAM), dynamic random access memory (DRAM), synchronous DRAM (SDRAM), read-only memory (ROM), any combination of such, or the like. The mass storage element 830 may include any type of non-transitory storage device, such as a solid state drive, hard disk drive, a magnetic disk drive, an optical disk drive, USB drive, or any computer program product configured to store data and machine executable program code. According to certain embodiments, the memory 820 or mass storage 830 may have recorded thereon statements and instructions executable by the processor 810 for performing any of the aforementioned method steps described above.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs).

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method for satellite communication across one or more orbital seams, the one or more orbital seams located between a first set of satellites having plural satellites and a second set of satellites having plural satellites, the method comprising:

alternatingly assigning the plural satellites of the first set into two or more groups of satellites;

alternatingly assigning the plural satellites of the second set into the two or more groups of satellites;

initiating acquisition, tracking and pointing (ATP) between a first satellite and a second satellite to establish communication between the first satellite and the second satellite, the first satellite and the second satellite having a first orbital seam between their respective orbits, the first satellite and the second satellite in a first group of satellites of the two or more groups, wherein a satellite in the first group of satellites only communicates with other satellites in the first group of satellites, wherein communication between the first satellite and the second satellite occurs during an inter-satellite link (ISL) lifetime;

initiating ATP between a third satellite and a fourth satellite to establish communication between a third satellite and a fourth satellite, the third satellite and the fourth satellite in a second group of satellites, the third satellite and the fourth satellite having a second orbital seam between their respective orbits; and at least upon establishment of communication between the third satellite and the fourth satellite, actively terminating communication between the first satellite and the second satellite prior to an end of the ISL lifetime, thereby enabling each of the first satellite and the second satellite to initiate ATP with another satellite in the first group of satellites prior to the end of the ISL lifetime.

2. The method according to claim 1, wherein a satellite in the second group of satellites only communicates with other satellites in the second group of satellites.

3. The method according to claim 1, wherein the third satellite and the fourth satellite have an established communication link until the end of the ISL lifetime.

4. The method according to claim 1, wherein assigning the plural satellites of the first set of satellites and assigning the plural satellites of the second set of satellites is performed based on one or more of dynamics of topology, link acquisition time and link lifetime.

5. The method according to claim 4, wherein the dynamics of topology include one or more characteristics of a satellite including size, speed, altitude, constellation density, number of satellites per orbit and orbital shell.

6. The method according to claim 1, wherein at least one pair of satellites in one of the two or more groups of satellites has an established communication link.

7. The method according to claim 1, wherein initiating ATP between a pair of satellites in a particular group of satellites of the two or more groups is offset in time from initiating ATP between another pair of satellites in another particular group of satellites of the two or more groups.

8. The method of claim 1, further comprising adjusting signal power associated with one or more of the first satellite and the second satellite to maintain communication between the first satellite and the second satellite to ensure completion of ATP between another pair of satellites prior to the end of the ISL lifetime.

9. An apparatus for satellite communication across one or more orbital seams, the one or more orbital seams located between a first set of satellites having plural satellites and a second set of satellites having plural satellites, the apparatus comprising:

a processor; and a non-transient memory for storing instructions that when executed by the processor cause the apparatus to be configured to:

alternatingly assign the plural satellites of the first set into two or more groups of satellites;

alternatingly assign the plural satellites of the second set into the two or more groups of satellites;

initiate acquisition, tracking and pointing (ATP) between a first satellite and a second satellite to establish communication between the first satellite and the second satellite, the first satellite and the second satellite having a first orbital seam between their respective orbits, the first satellite and the second satellite in a first group of satellites of the two or more groups, wherein a satellite in the first group of satellites only communicates with other satellites in the first group of satellites, wherein communication between the first satellite and the second satellite occurs during an inter-satellite link (ISL) lifetime;

initiate ATP between a third satellite and a fourth satellite to establish communication between a third satellite and a fourth satellite, the third satellite and the fourth satellite in a second group of satellites, the third satellite and the fourth satellite having a second orbital seam between their respective orbits; and upon establishment of communication between the third satellite and the fourth satellite, actively terminate communication between the first satellite and the second satellite prior to an end of the ISL lifetime, thereby enabling each of the first satellite and the second satellite to initiate ATP with another satellite in the first group of satellites prior to the end of the ISL lifetime.

10. The apparatus according to claim 9, wherein a satellite in the second group of satellites only communicates with other satellites in the second group of satellites.

11. The apparatus according to claim 9, wherein the third satellite and the fourth satellite have an established communication link until the end of the ISL lifetime.

12. The apparatus according to claim 9, wherein the instructions when executed by the processor further cause the apparatus to be configured to assign the plural satellites of the first set of satellites and assign the plural satellites of the second set of satellites based on one or more of dynamics of topology, link acquisition time and link lifetime.

13. The apparatus according to claim 12, wherein the dynamics of topology include one or more characteristics of a satellite including size, speed, altitude, constellation density, number of satellites per orbit and orbital shell.

14. The apparatus according to claim 9, wherein at least one pair of satellites in one of the two or more groups of satellites has an established communication link.

15. The apparatus according to claim 9, wherein the instructions when executed by the processor further cause the apparatus to be configured to initiate ATP between a pair of satellites in a particular group of satellites of the two or more groups offset in time from initiating ATP between another pair of satellites in another particular group of satellites of the two or more groups.

16. The apparatus of claim 9, wherein the instructions when executed by the processor further cause the apparatus to be configured to adjust signal power associated with one or more of the first satellite and the second satellite to maintain communication between the first satellite and the second satellite to ensure completion of ATP between another pair of satellites prior to the end of the ISL lifetime.

\* \* \* \* \*